No. 770,526. PATENTED SEPT. 20, 1904.
E. A. JOHNSTON.
THROAT ADJUSTING DEVICE FOR CORN HARVESTERS.
APPLICATION FILED DEC. 30, 1903.
NO MODEL. 2 SHEETS—SHEET 1.
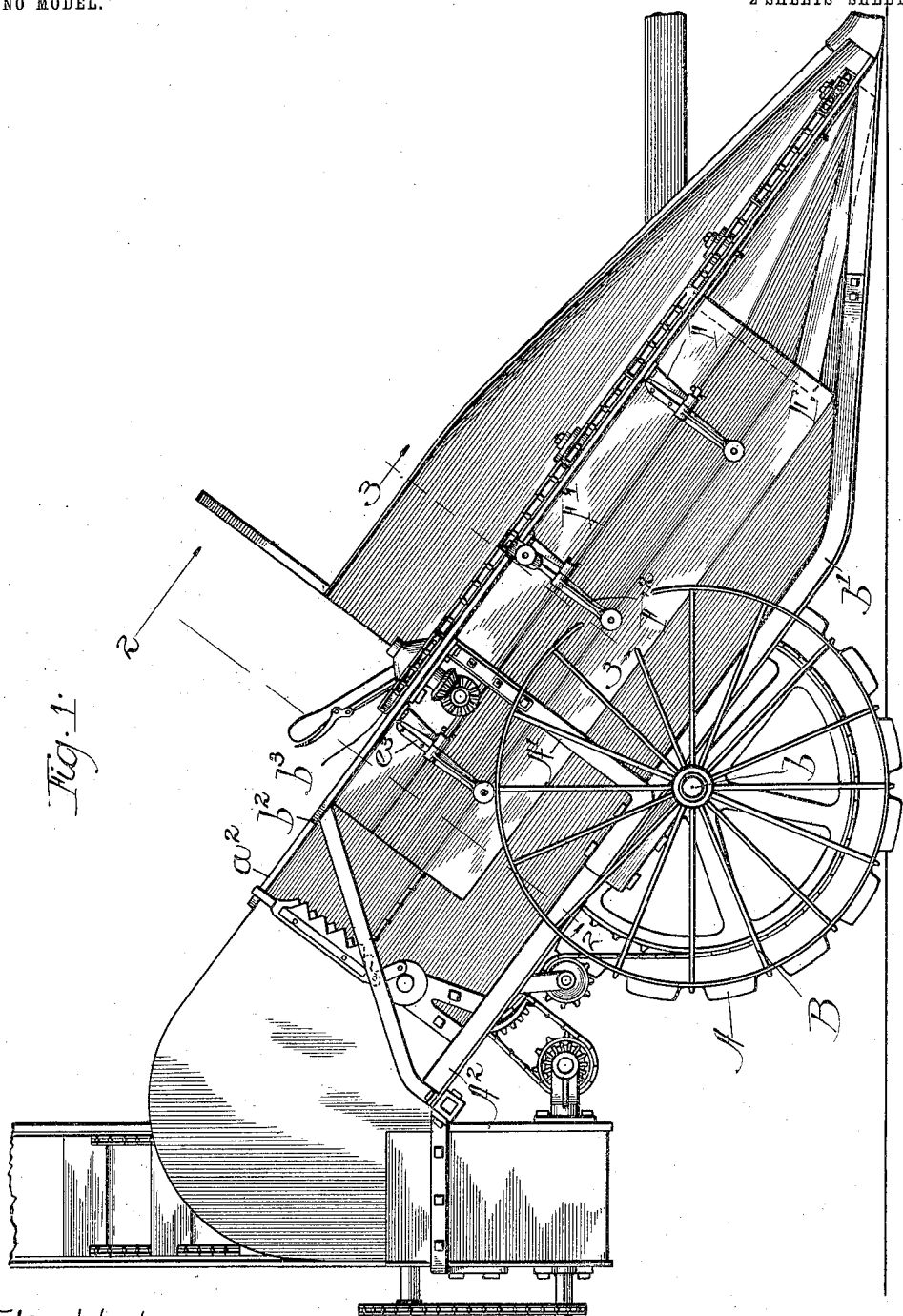

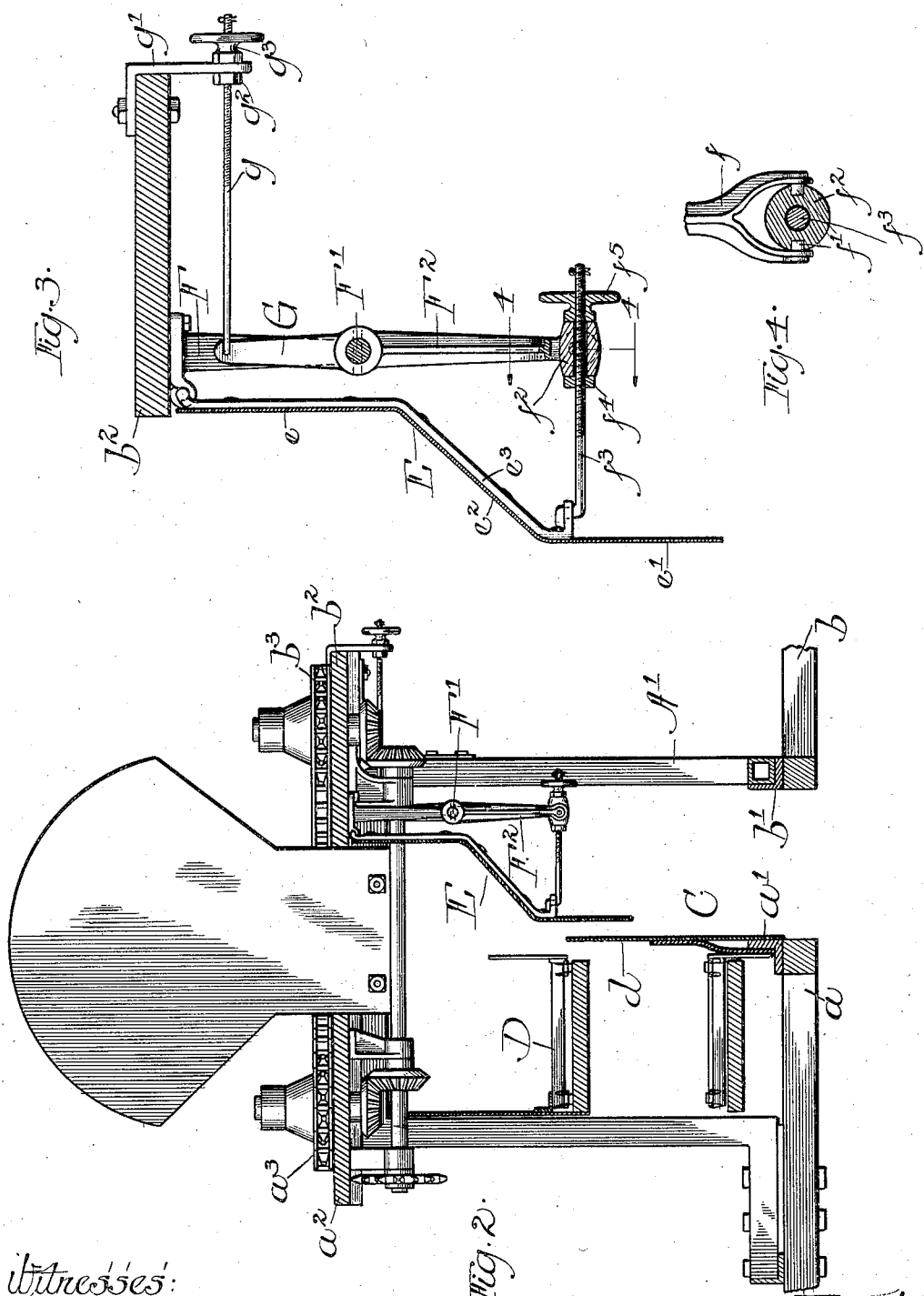

No. 770,526. Patented September 20, 1904.

UNITED STATES PATENT OFFICE.

EDWARD A. JOHNSTON, OF CHICAGO, ILLINOIS, ASSIGNOR TO INTERNATIONAL HARVESTER COMPANY, OF CHICAGO, ILLINOIS, A CORPORATION OF NEW JERSEY.

THROAT-ADJUSTING DEVICE FOR CORN-HARVESTERS.

SPECIFICATION forming part of Letters Patent No. 770,526, dated September 20, 1904.

Application filed December 30, 1903. Serial No. 187,106. (No model.)

*To all whom it may concern:*

Be it known that I, EDWARD A. JOHNSTON, a citizen of the United States, residing at Chicago, in the county of Cook and State of Illinois, have invented certain new and useful Improvements in Throat-Adjusting Devices for Corn-Harvesters, of which the following is a specification sufficiently clear and exact to enable those skilled in the art to which it appertains to make and use the same.

The invention relates in general to corn-harvesters, and in particular to that class known as "strippers;" and it has for its object to provide means for adjusting the throat or stalk passage-way in said machines, which means is positive in its action.

In corn-stripping machines of the type which has the ear stripping or picking device on one side only of the throat or stalk passage-way it is necessary to provide a deflector or presser-board on the side opposite from the stripping device to hold the ears in the path of the latter. A machine of this type is shown in my patent numbered 747,611 and dated December 22, 1903. In this machine the deflector is held in position by means of springs, which permit it to yield away from the stripping device in case a mass of stalks is forced into the machine at one time to prevent the possibility of choking. In some condition of corn this is found objectionable, however, since it is impossible to press the stalks individually up to the stripping device, so that the ears will be deflected into the path thereof for the purpose of stripping them from the stalks. It is also objectionable because the deflector continually presses the stalks against the stripping device, so that they are badly cut up by the same, whereby a mass of leaves and broken stalks is carried along with the ears by the conveyer, overtaxing the cleaning and husking devices.

The present invention is designed to overcome the above objections. The deflector is held in a fixed position relative to the stripping device and made positively adjustable in its relation therewith, whereby it is impossible for a mass of stalks to be forced through the machine at one time. In case there is a tendency to this end the deflector retards the mass, permitting the stalks to pass through in consecutive order, thus insuring the stripping of all of the ears and preventing the stalk from being held unnecessarily tight against the stripping device, making the latter cleaner in its action.

An embodiment of the invention is shown in the accompanying drawings, forming a part of this specification, in which like characters of reference designate like parts.

Referring to the drawings, Figure 1 is a side elevation of a corn-stripping machine, showing the manner of applying the invention. Fig. 2 is a fragmentary transverse sectional elevation, on an enlarged scale, taken on a plane indicated by line 2 2 of Fig. 1, showing the relation between the deflector and the stripping device. Fig. 3 is a fragmentary transverse sectional elevation taken on a plane indicated by line 3 3 of Fig. 1, showing the details of construction of the means for adjusting the deflector. Fig. 4 is a sectional elevation taken on a plane indicated by line 4 4 of Fig. 3, showing the manner of mounting the pivoted collar in the rocker-arm.

Referring to Figs. 1 and 2, A designates the supporting and traction wheel, and B the supporting-wheel, which are mounted, respectively, upon the axles $a$ and $b$, united by means of the arched truss A', which form a part of the main frame A². Secured to these axles and forming a part of the main frame are the forward-projecting gatherer-sills $a'$ and $b'$, to the front ends of which are secured, respectively, the gatherer-boards $a^2$ and $b^2$, both of which are supported near their upper ends upon the arched truss, thus forming the inner and outer gatherer-prongs. Upon these boards are mounted the usual gatherer-chains $a^3$ and $b^3$, each of which is provided with a suitable shield. Between the gatherer-prongs is the usual throat or stalk passage-way C, on the inside of which is located the ear stripping and conveying device D, the return portion of which is protected from contact with the cornstalks by means of the shield $d$, which is secured to the inner gatherer-sill. All of these parts and the machine as a whole are shown and described in the patent above referred to and need not be further described here.

Hinged to the outer gatherer-board $b^2$ is the deflector or presser-board E, which is similar to the corresponding deflector shown in the patent above referred to. It extends almost the entire length of the stripping device, the front end of each of which lie in substantially the same transverse vertical plane. It is preferably formed of sheet metal which is bent longitudinally, so that its upper and lower portions $e$ and $e'$, respectively, are in offset parallel planes, which are also substantially parallel with the plane of the stripping device. The intermediate portion $e^2$ forms an obtuse angle with each of the other portions, whereby the ears are deflected into the path of the stripping device. Suitable stiffening members $e^3$ are provided, the upper end of each of which preferably forms one member of each of the hinges $e^4$, the other member of which will soon be described. It will readily be seen that the deflector might be secured rigidly to the outer gatherer-board, provided the resilience of the material of which it is made is sufficient to permit its adjustment.

Secured to the inner gatherer-board is a plurality of downhangers or brackets F, each of which preferably provides the other member of the hinge $e^4$ for the deflector above described. In bearings in these brackets is journaled the rock-shaft F', to which is secured a plurality of rocker-arms F². Each of these rocker-arms is provided at its lower end with a yoke $f$, the arms of which have the pintles $f'$, upon which are pivoted the collar $f^2$. Within each of these collars is slidably mounted a screw-threaded link $f^3$, which is pivotally connected with the deflector E near its lower edge. Each of these links is provided with threaded nuts $f^4$ and $f^5$, one on each side of the collar, the outer one of which is provided with a hand-wheel, whereby it may be turned. By these means the lower edge of the deflector may be set parallel with the stripping device or either end set nearer thereto than the opposite one, its resilience permitting the same. Secured to the rock-shaft F' is the rocker-arm G, which is preferably integral with one of the above-described rocker-arms. It is connected, by means of a screw-threaded link $g$, to the bracket $g'$, secured to the outer gatherer-board, which link is provided with nuts $g^2$ and $g^3$, which are similar, respectively, to the nuts $f^4$ and $f^5$ and perform the same functions. By the means above described the deflector E may be held positively in any desired position relative to the stripping device.

The operation of the invention will be understood from the above description without further comment. It might be pointed out, however, that the adjustment of the deflector depends upon the condition of the corn. If the stalks are small and have a large growth of leaves at the top, it will be found desirable at times to adjust the deflector so that the throat will be narrower at the front lower end than at the rear upper end. If the stalks are large and have only a small growth at the top, it may be required to adjust the throat in a reverse manner. In other conditions the throat will need to be substantially the same width throughout. When once the deflector is adjusted so as to permit the passage of the largest stalks, it remains in this position, preventing a mass of stalks passing through at one time, thus overcoming the objections above pointed out.

Having thus described my invention, what I claim as new, and desire to secure by Letters Patent, is—

1. In a corn-harvester, the combination of gatherer-prongs having a throat between them and means for varying the width of said throat, which means is adjustable in any desired position relative to the side of said throat opposite thereto.

2. In a corn-harvester, the combination of gatherer-prongs having a throat between them, which extends rearward, and means for varying the width of said throat, which means is adjustable laterally and to any desired angle with the side of said throat opposite thereto.

3. In a corn-harvester, the combination with the stripping device, of a deflector opposite thereto and means for positively adjusting the same at any desired angle.

4. In a corn-harvester, the combination with the stripping device, of a deflector opposite thereto and a plurality of independently-adjustable means connecting said deflector with a relatively stationary part whereby said deflector may be adjusted at any desired angle.

5. In a corn-harvester, the combination with the stripping device, of a hinged deflector opposite thereto, a rock-shaft, a plurality of independently-adjustable means connecting said rock-shaft and deflector and means for maintaining said rock-shaft in any desired position.

6. In a corn-harvester, the combination with the stripping device, of a deflector opposite thereto, a rock-shaft, rocker-arms secured to said rock-shaft which are connected with said deflector and means for maintaining said rock-shaft in any desired position.

7. In a corn-harvester, the combination with the stripping device, of a hinged deflector opposite thereto, a rock-shaft, rocker-arms secured to said rock-shaft, a plurality of independently-adjustable means connecting said deflector and rocker-arms and means for maintaining said rock-shaft in any desired position.

8. In a corn-harvester, the combination with the stripping device, of a hinged deflector opposite thereto, a rock-shaft, downward-projecting rocker-arms secured to said rock-shaft and pivotally connected with said deflector and an upward-projecting rocker-arm also secured to said rock-shaft and pivotally connected with a relatively stationary part.

9. In a corn-harvester, the combination with the stripping device, of a hinged deflector opposite thereto, a rock-shaft, downward-projecting rocker-arms secured to said rock-shaft, adjustable links pivotally connected to said deflector and rocker-arms, an upward-projecting rocker-arm also secured to said rock-shaft and an adjustable link pivotally connected to said upward-projecting rocker-arm and secured to a relatively stationary part.

In testimony whereof I have signed my name to this specification in the presence of two subscribing witnesses.

EDWARD A. JOHNSTON.

Witnesses:
 WILLIAM WEBBER,
 A. E. CHADWICK.